Patented July 29, 1941

2,251,041

UNITED STATES PATENT OFFICE 2,251,041

MANUFACTURE OF NICOTINE

Karl Basil Edwards, London, England

No Drawing. Application October 5, 1940, Serial No. 359,910. In Great Britain November 7, 1939

5 Claims. (Cl. 260—291)

This invention relates to the manufacture of nicotine and more particularly to the production of free nicotine alkaloid in a state of high purity from commercial nicotine sulphate which is the accustomed form in which nicotine is recovered from tobacco.

In the normal course of carrying out this operation, aqueous alkalies are added to nicotine sulphates with or without the addition of common salt and the separated crude nicotine filtered and concentrated. This process is not only tedious but also involves considerable loss of nicotine, and, as the commercial nicotine sulphates contain iron and other metals and often resinous substances, may result in the formation of extremely intractable emulsions. The nicotine so produced contains all oils and impurities which were present in the nicotine sulphate and which are soluble in free nicotine. The aqueous solution of sodium sulphate contains a considerable amount of dissolved nicotine which has to be recovered and the whole process is one which exposes the operators to the vapours of nicotine and other noxious volatile substances usually present in commercial nicotine sulphate.

The present invention has for its chief object to provide a novel process whereby the yield of free nicotine is substantially quantitative and the whole process can be carried out in enclosed vessels so that a product of high concentration and high degree of purity is obtained directly without noxious effluents or danger to the operators.

With this object in view, the present invention provides a process for the production of nicotine alkaloids from commercial nicotine sulphate wherein sodium hydroxide or potassium hydroxide is added to commercial nicotine sulphate until at least a slight excess is present whereafter the mixture is dehydrated by heating with dephlegmation of the vapour under reduced pressure.

According to one embodiment of my invention, solid sodium hydroxide, in quantity sufficient to neutralise all free and combined sulphuric acid and to leave a small excess, is added to commercial nicotine sulphate containing about 40/50% of nicotine alkaloid by weight and the mixture is subjected to gentle agitation, whereupon the sodium hydroxide, which should preferably be in flake or powder form, will dissolve with evolution of heat and combine with the sulphuric acid to form an extremely concentrated solution of sodium sulphate with a separation of nicotine, and the whole of this operation can be carried out in a closed vessel. By placing this mixture under reduced pressure and applying heat and passing the vapours through a suitable dephlegmating column or similar system of fractionation, the mixture can be dehydrated as a whole and providing that the vapour issuing from the top of the dephlegmator is controlled in temperature to approximately that of boiling point of water at the pressure maintained, the aqueous distillate contains only a very small percentage of nicotine varying according to the degree of vacuum utilised. At pressures of 70/75 mm. the percentage of nicotine in the aqueous distillate under these circumstances is of the order of 0.6%. The aqueous vapour is preferably condensed by means of a reflux condenser thus allowing of the removal of extremely volatile impurities such as ammonia which may be, if desired, recovered by means of an acid trap placed in any suitable position before the vacuum pump. The dehydration of the mixture described above is carried on until most of the water available has been removed and the temperature of the vapour from the still rises appreciably above that of the boiling point of water at the working pressure, when a small stream of superheated steam at slightly above the working pressure is passed into the material in the still. Under the conditions what would appear to be hydrates of nicotine are formed which have a much lower boiling point than nicotine and these hydrates distil, and it has been found that they can be separated by dephlegmation and that the condensate from the bottom of the dephlegmator if kept at approximately 100° C. at 70–80 mm. pressure consists of almost anhydrous nicotine while the vapour from the top of the dephlegmator still contains only a very small amount of nicotine if controlled as above. The process differs from superheated steam distillation in vacuum as usually applied inasmuch as the amount of steam used is small. The total amount of aqueous distillate including dehydration water amounts to little, if any, more than the original weight of commercial nicotine sulphate used.

The temperature in the still is slowly raised and superheated steam passed until substantially all nicotine has been removed, as shown by the cessation of the flow from the base of the dephlegmating column, and the finishing temperature in the still should be in the neighbourhood of 130/150° C. The sodium sulphate becomes anhydrous, leaving a dry, powdery deposit mainly consisting of anhydrous sodium sulphate with compounds of iron and other non-volatile impurities. The process is now stopped, the vacuum broken, and the nicotine removed. The aqueous distillate may then be run into the still to dissolve the sodium sulphate and the solution so obtained discharged into a suitable vessel from which superheated steam may be produced for operating the next charge when substantially all residual traces of nicotine from the still and water will be volatilised and be recovered in the next operation when the final effluent from this steam unit will be substantially free from nicotine. It has been found that traces of oils commonly present in commercial nicotine sulphates do not accumulate in the nicotine in the base of the dephlegmator but mainly pass over with the water vapour and can be separated from the condensed water leaving a nicotine containing a very much smaller quantity of oil.

Automatic temperature control can be suitably utilised for the control of the cooling water at the top of the dephlegmating column as it is essential that the vapour issuing from the top of this column shall not be materially above the temperature at which water boils under the pressure maintained.

Any suitable known plant may be used and the still may be fitted with agitators and, if desired, the sodium hydroxide may be added in a solution or replaced by potassium hydroxide. The dephlegmator may be any form of fractionating column or device and may, if desired, operate in two or more stages and may be fitted with oil traps or any other known methods of separation of the volatile substances.

The process may be operated at any convenient pressure, which may, if desired, be varied at different stages and the strength of the recovered nicotine may be adjusted by varying the temperature at the base of the dephlegmator while nicotine may be withdrawn from the still after dehydration if a proportion of dark nicotine is desired, the process otherwise being unaffected, or the nicotine may be removed as far as practical by filtration and the residual dry nicotine treated separately by the distillation process.

The following example illustrates how the process of the invention may be carried into effect:

A substantially completely jacketed still fitted with splash preventer, scraper agitators, charging door and superheated steam pipe into the interior of the still, was attached to a temperature controlled dephlegmating column, the vapour effluent of which passed to a reflux condenser and from the top of the reflux condenser to a water cooled acid trap and thence to a vacuum pump. Suitable receptacles for nicotine from the base of the column and condensed water from the reflux condenser were provided, all the units being of known and usual design, and fitted with the usual accessories.

500 parts of commercial nicotine sulphate assaying 40.4% of nicotine were placed in the still and to this was added, with agitation, 70 parts of powdered sodium hydroxide, the charging opening was closed and agitation continued until solution and reaction was complete, when the aqueous liquor had a pH value of over 12 and the temperature had risen to 70/75° C. The pressure in the whole apparatus was reduced slowly to 70/75 mms. of mercury by means of the vacuum pump and maintained there when dehydration of the mixture in the still commenced. The temperature at the top of the dephlegmator throughout was controlled to 46/47° C. and at the base to 95/97° C. Sufficient heat was applied to the still to give a steady flow of condensed water from the reflux condenser. The temperature in the still vapours remained substantially constant until most of the water had been removed when it gradually rose, the evolution of water falling off steadily, with small quantities of nicotine coming from the base of the dephlegmator. When the still temperature in the vapour reached 100° C. a small stream of expanded steam superheated to 120° C. was passed slowly into the mixture contained in the still and the heating increased. Distillation of the free alkaloids commenced rapidly and the temperature was slowly raised to 125/130° C. in the still vapour when nicotine alkaloids and water distilled in the proportion of approximately 2½ to 1 until the bulk of the nicotine had distilled. The passage of superheated steam and heating was continued until the flow of nicotine from the base of the dephlegmator had practically ceased, when the superheated steam was turned off, the heating of the still discontinued and the vacuum broken. The water condensed from the reflux condenser contained appreciable quantities of petroleum oil which were separated and the water returned to the still, the agitators kept running until all sodium sulphate in the still had been dissolved and the sodium sulphate solution was then discharged to a steam heated boiler to be partially evaporated at atmospheric pressure or above to supply superheated steam for the next charge. The yields obtained were as follows:

| | Parts |
|---|---|
| Total water recovered | 420 |
| Recovered nicotine of 99.1% strength | 199 |
| Nicotine in superheated steam produced for next charge | 4.9 |
| Nicotine in effluent from steam producer after next charge | 0.1 |

The assays were conducted by the standard silicotungstic acid method and the yield of nicotine alkaloids was substantially quantitative. Ammonia and very volatile impurities in the acid trap was discarded. It was found that the process could be accelerated if the dehydration only was carried out at a higher pressure (e. g. 200 mm.) in the still and the vapour expanded to 70/75 mm. pressure before reaching the dephlegmator or alternatively by condensing the water produced at the higher pressure and re-evaporating it at a lower pressure.

The term "nicotine" is throughout used to include the mixture of alkaloids contained in commercial nicotine sulphate and no claim is made for the production of chemically pure nicotine.

I claim:

1. A process for the production of nicotine alkaloids from commercial nicotine sulphate which comprises adding a substance selected from the group consisting of sodium hydroxide and potassium hydroxide to commercial nicotine sulphate until at least a slight excess is present and dehydrating the mixture by heating with dephlegmation of the vapour under reduced pressure.

2. A process for the production of nicotine alkaloids from commercial nicotine sulphate which comprises adding a substance selected from the group consisting of solid sodium hydroxide and potassium hydroxide to commercial nicotine sulphate until an excess is present and dehydrating the mixture by heating with dephlegmation of the vapour under reduced pressure.

3. A process for the production of nicotine alkaloids from commercial nicotine sulphate which comprises adding a substance selected from the group consisting of sodium hydroxide and potassium hydroxide to commercial nicotine sulphate until an excess is present, dehydrating the mixture by heating until substantially all the water has been removed, introducing superheated steam at reduced pressure into the mixture and separating the constituents of the vapour produced by dephlegmation under reduced pressure.

4. A process for the production of nicotine alkaloids from commercial nicotine sulphate which comprises adding a substance selected from the group consisting of sodium hydroxide and potassium hydroxide to commercial nicotine sulphate until at least a slight excess is present, dehydrating the mixture by heating until substantially all the water has been removed, introducing superheated steam at reduced pressure into the mixture, separating the constituents of the vapour produced by dephlegmation under reduced pressure and dissolving the residue, which consists mainly of sodium sulphate, in the aqueous liquid produced by the distillation and employing the solution for producing superheated steam for a subsequent operation.

5. A process for the production of nicotine alkaloids from commercial nicotine sulphate which comprises adding a substance selected from the group consisting of sodium hydroxide and potassium hydroxide to commercial nicotine sulphate until the pH value of the mixture is at least 12, and dehydrating the mixture by heating with dephlegmation of the vapour under reduced pressure.

KARL BASIL EDWARDS.